April 12, 1960   M. P. HARRIGAN   2,932,422
FASTENER DRIVING DEVICES
Filed May 25, 1956   2 Sheets-Sheet 2
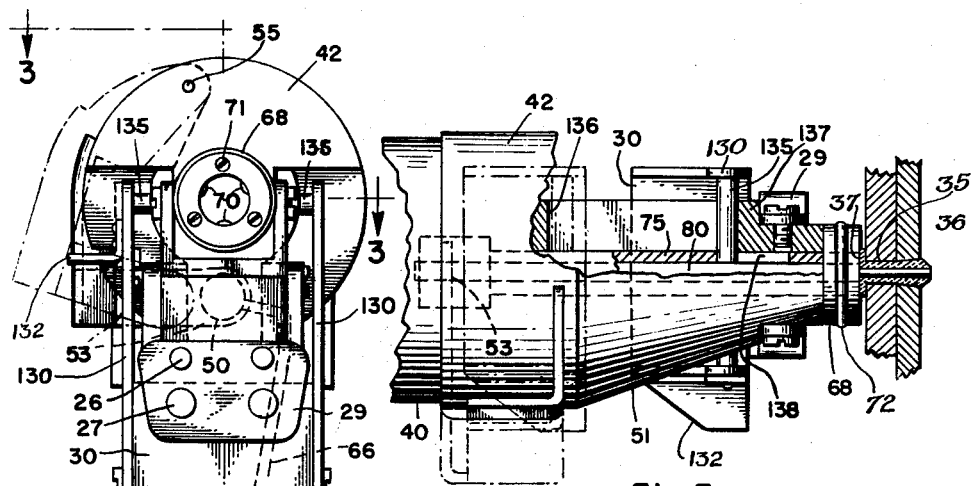
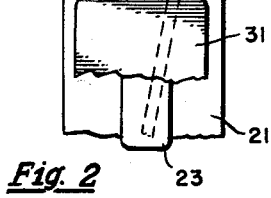
Fig. 2
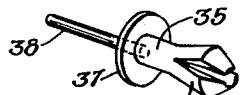
Fig. 6
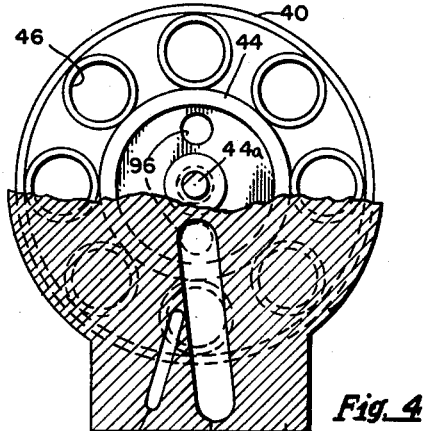
Fig. 4
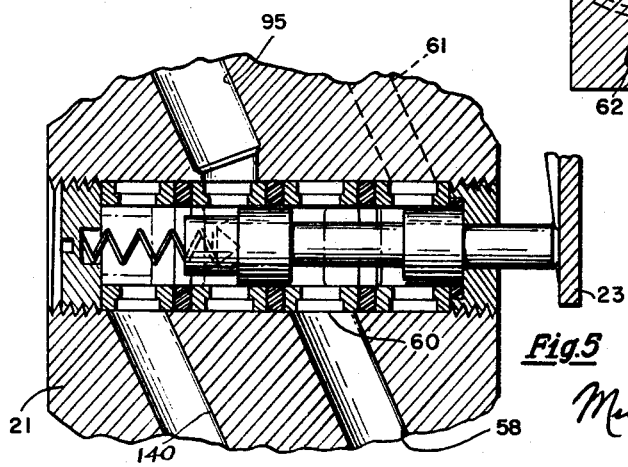
Fig. 5
INVENTOR:
MARVIN P. HARRIGAN
BY
Milo B. Stevens & Co.
ATTORNEYS.

United States Patent Office 2,932,422
Patented Apr. 12, 1960

2,932,422

FASTENER DRIVING DEVICES

Marvin P. Harrigan, Franklin Park, Ill.

Application May 25, 1956, Serial No. 587,421

7 Claims. (Cl. 218—34)

My invention relates to fasteners in the nature of rivets, which are designed to be driven into sheets, plates or the like to secure them together. The fastener herein considered requires that the work be perforated before the fastener is driven into the same; and such fastener is composed of a divided stem originating from a flat head, and a plug extending behind the latter and adapted to be driven into the fastener for the purpose of expanding the same retentively in the work. Fasteners of this kind usually are driven by hand, and it is one object of the present invention to provide a device which will produce a quick power drive for the fasteners, in order to save time and labor.

A further object is to design a device of the above character in the form of a gun held conveniently in the hand and applied with facility to the places where fasteners are to be driven.

An additional object is to employ a compressed air feed in the device which operates in two stages, namely, to set the fastener in place for the driving action, and then to actuate a ram to drive the fastener.

Another object is to employ a two-stage control for the advance of the fastener, namely, one to drive the fastener into the work, and a succeeding one to drive the expansion plug into the fastener.

A still further object is to employ a compact piston mechanism in connection with the ram and a core slidable therein, whereby to create a driving impact on the ram first and a succeeding impact on the core, these operations procuring the driving of the fastener into the work and the insertion of the aforesaid plug into the driven fastener for expanding and retaining the same in the work.

Another object is to provide a body portion for the present device which accommodates a multi-chambered type of magazine for the fasteners operable in the manner of a revolver cylinder to place series of fasteners in line for use in the device.

An important object is to build the novel device along lines of simplicity and compactness.

With the above objects in view, a better understanding of the invention may be had by reference to the accompanying drawings, in which:

Fig. 2 is a front elevation of the fastener, as seen from the right-hand end of Fig. 1;

Fig. 3 is a top plan view of the forepart of the fastener, showing its application to the work;

Fig. 4 is a section taken on the line 4—4 of Fig. 1;

Fig. 5 is an enlargement of a slide valve mechanism in the lower central portion of Fig. 1; and Fig. 6 is a perspective view of the type of fastener under consideration.

Figure 1:
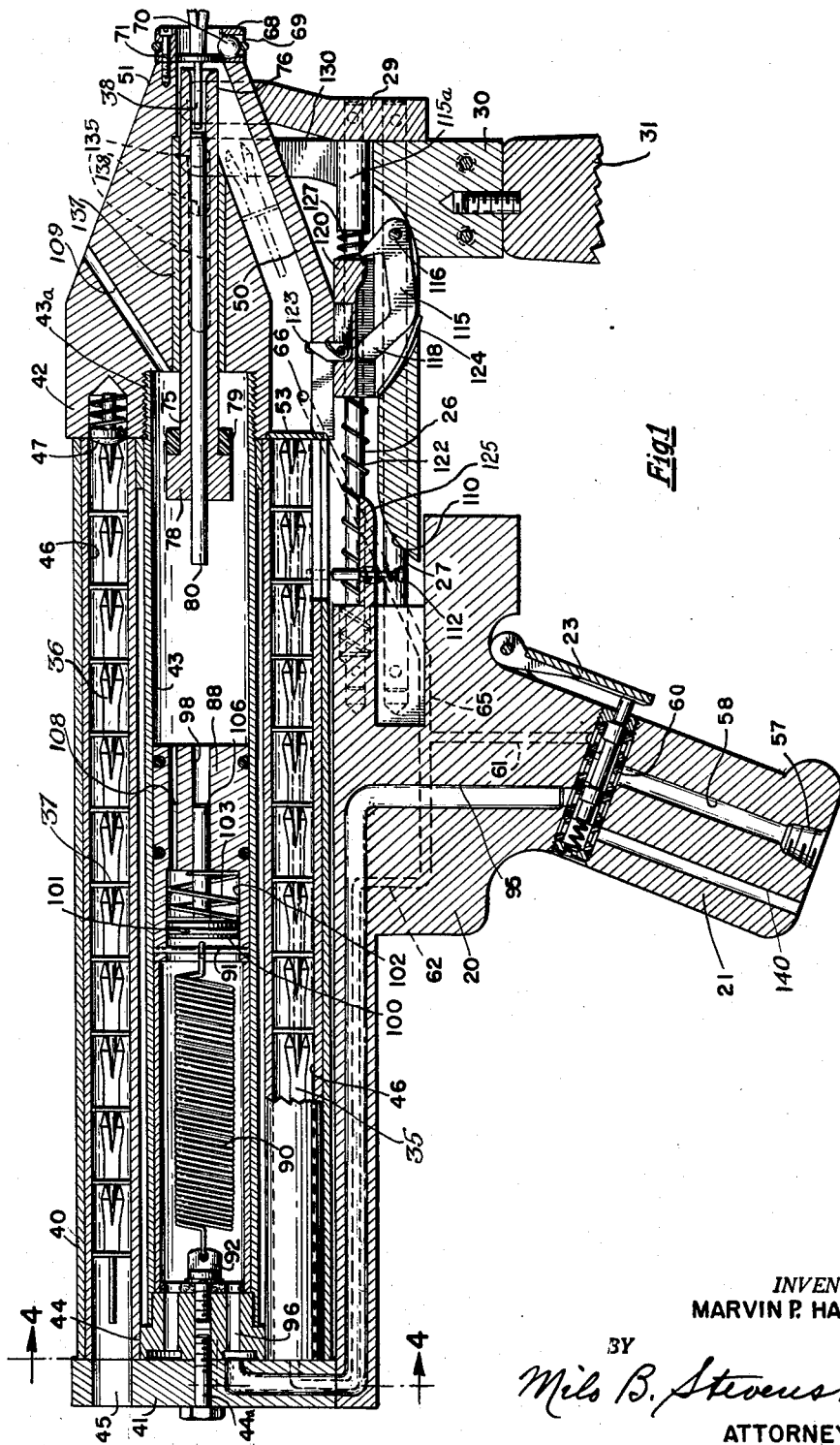
Fig. 1 is a longitudinal section through the device, partly broken away.

In accordance with the foregoing, specific reference to the drawings indicates the stock or body of the device at 20, the same preferably being of cast aluminum. The lower part of the body 20 is extended downwardly with a handle 21 designed for the support of the device and the actuation of a trigger 23. In front, the body is extended with upper and lower guide rods 26 and 27 for the support of a cross-head 29 and the mounting of a fastener setting slide 30 formed with a depending operating handle 31. Primarily, the handle 31 is actuated to set the fastener in place against the work, while the trigger 23 is next employed to drive the fastener through the same.

Fig. 6 shows that the fastener is formed with a shank 35 which is divided three ways to define a cluster of stems 36. Behind the shank is a disc-like head 37; and a plug 38 is set in the head 37 and projects rearwardly therefrom. The design of the fastener favors its grouping in longitudinal sequence to form a series, as depicted in the center part of Fig. 1. In order that an adequate supply of the fasteners may be had whenever the device is to be used, a magazine 40 is mounted in the upper part of the body 20. Thus, Figs. 1 and 4 show that the magazine is a long cylindrical body which is mounted between a back wall 41 and frontal abutment 42 of the body 20, the magazine being centered for rotation on a tube 43 screwed with its front end into the abutment 42 as shown at 43a, and supported at the rear by a plug 44 bolted at 44a to the back wall 41. The latter has an opening 45 at the top for the insertion of a string or series of the fasteners into one of a number of chambers 46 carried by the magazine; and the latter is of course rotatable step by step in order to aline the chambers 46 with the opening 45 for the purpose stated. A spring button 47 is mounted in the abutment 42 for indexing the steps in the rotation of the magazine.

The treatment of the fastener begins in the lowermost chamber of the magazine; and Fig. 1 shows that such chamber is continued in forward direction in the form of a passage 50 which rises toward the front end or nose 51 of the body 20. Normally, a gate 53 hinged at the top in the body 20, as indicated at 55 in Fig. 2, forms a barrier between the lowest chamber 46 and the passage 50. The handle 21 has a socket 57 for connecting a compressed air hose (not shown) to the device. The socket continues with a duct 58 which rises into a slide valve 60 designed to control the compressed air in the duct 58. When the device is ready for use and the compressed air has been turned on, the slide valve is open—as shown in Fig. 5—so that air travels into a passage 61 in the body 20, such passage having a rearward branch 62 which leads the compressed air into the rear end of the lowermost chamber 46, so that such air may exert force normally to maintain the corresponding series of fasteners in forward engagement with the gate 53. The air passage 61 also has a forward branch 65 which leads into the side of the passage 50, as indicated at 66, the object of this branch being to create a forward current of air in the passage 50.

To use the device, the first object is to move the foremost fastener in the series shown to a point where it projects from the nose 51 of the device for insertion into the opening of the work. The position of the fastener in such event is shown in Fig. 1, the fastener being supported in a bearing 68. The latter is a ring with openings 69 which seat three equally spaced balls 70 spring-retained by a ring 72, as indicated in Fig. 2, the ring being secured to the nose 51 by bolts 71. It is seen that the head 37 of the fastener 35 seats against the balls 70 and is centered by the same.

When the fastener 35 is seated as shown, it is directly in front of the ram mentioned previously, which is indicated at 75. The ram is a long tube having a flared front end 76 for engagement with the fastener head, and an anvil 78 at its rear end, the anvil having a backing cushion 79. The bore of the ram is occupied by a rod 80 which normally projects to the rear of the anvil 78 into the tube 43.

Means are located in the central tube 43 for imparting driving blows to the anvil 78 and the rod 80, so that such blows may be transmitted to the fastener. For this purpose, a primary piston 88 is slidably disposed in the tube 43 and normally drawn toward the rear end of the same by a coil spring 90 connected at the front to a cross-pin 91 of the piston 88 and at the rear to a bolt 92 driven into the plug 44. Fig. 1 shows the normal position of the piston 88. However, the slide valve 60 also controls an inlet from the duct 58 into a larger air passage 95 which extends to the rear of the device and returns through the plug 44 as indicated at 96, to open into the center tube 43. Thus, while the trigger 23 normally allows passage of compressed air into the tube 61, the drawing or squeezing of the trigger cuts this passage off and transfers the air supply to the passage 95, which action has the effect of driving the piston 88 in forward direction. The front end of the piston is bored axially as indicated at 98, in order to clear the rear end portion of the rod 80, so that the piston will strike the anvil 78 directly and impart a driving blow to the fastener 35.

A secondary piston 100 sealed annularly by a packing ring 101 is operable in a rear cavity 102 of the piston 88, being urged rearwardly by a coil spring 103 to seat against the pin 91. The piston 100 is carried by the rear end of a central plunger 106, the latter being alined with the ram rod 80 and of slightly greater diameter. It is now apparent that the air drive against the primary piston 88 also will be communicated to the piston 100, so that the primary piston will lead the central plunger 106 from the start of the movement induced by the air so that the primary piston will strike the ram anvil 78 first; and the drive of the plunger 106 will follow that of the piston 88 instantly to impel the rod 80 in forward direction. As the front end of this rod is immediately behind the plug 38 of the fastener, it follows that the second piston action will drive the plug into the body of the fastener and cause its expansion to secure the work retentively. A relief passage 108 is made through the piston 88 to free the advance of the piston 100; and a like passage 109 is made in the body 20 from the front end of the center tube 43.

The mechanism for setting the fasteners or cocking the device, so to speak, will now be described. It will be recalled that the first action in operating the device was the drawing of the slide handle 31 in rearward direction. One effect of this action is accomplished by a cam 110 in respect to a spring-backed plunger 112 journaled vertically in the body of the device and forming a barrier. The rearward travel of the cam 110 therefore lifts the barrier 112 to the dotted line position in the center of Fig. 1, where it will be in front of the second foremost fastener, checking the advance of the same and fasteners to the rear. The slide 30 also carries a pawl 115 which is pivoted to the slide at 116 and extends rearwardly with an inclined arm 118. When the slide is retracted, its pawl 115 impinges on a block 120 slidable on the guide rod 26 against the tension of a spring 122 coiled around the latter. The block carries a spring-pivoted latch 123, whose rear side is tapered. Thus, a given rearward stroke of the slide 30 causes the latch 123 to pass under the head of the first fastener 35 and get behind it. As this occurs, the arm 118 of the pawl 115 meets and yields downwardly to a body cam 125, swinging the bill of the pawl clear of the block 120. The latter now yields to the force of the spring 122, causing the latch 123 to push the foremost fastener 35 into the passage 50, where the air pressure from the passage 66 will force the fastener to the set position. The sudden forward movement of the block 120 as stated is cushioned by a spring 127 coiled around the guide rod 26 behind a sleeve 115a forming part of the slide 30.

Mention was made in a previous section that a pivoted gate 53 acted as a frontal bar to the series of fasteners, as shown in Fig. 1 and by means of dotted lines in Fig. 2. As the pawl 115 releases the block 120 for forward movement, the gate is swung aside to the dot-and-dash position of Fig. 2 to clear the passage 50 for the advance of the foremost fastener. The means for doing this originate with a pair of risers 130 from the slide 30, one of which carries a tapered side cam 132. The latter crowds the gate from the inner side to swing as stated. The risers also carry inward side pins 135 which pass through long slots 136 in a bearing sleeve 137 for the ram 75 into short slots 138 in the latter. The slots 138 are for leeway before the slide takes hold, while slots 136 are to guide the pins 135 and determine the stroke of the slide. It is proper to point out that the retraction of the slide handle 31 accomplishes the additional operation of backing the ram 75 out of a position blocking the passage 50, so that a clearance is created for the advance of the foremost fastener to the frontal position shown. The backing of the slide—against the tension of the springs 122 and 127—is of course only temporary, and the ram returns to the frontal position shown the moment the slide handle 31 is released, the slots 135 and 138 allowing leeway in this respect.

While the constant air current in the passage 50 between driving operations tends to position the fastener properly in the nose of the device, it is possible that the angular application of the device, or pressing the tip of the fastener against a work projection, may swerve the fastener to an angular position. The front end of the ram is therefore used as a backing for the fastener when the handle 31 is in the forward position shown in Fig. 1. Now the side pins 135 bear against the front ends of the ram slots 138. After the fastener is held as just stated the operation of the trigger 23 performs the driving operations previously described. Now, as the trigger is released, the slide valve 60 cuts off the air to the passage 95 and opens an exhaust duct 140 into line with the same. The resulting return of the pistons 88 and 100 by the springs 90 and 103 will force residual air in the center tube 43 and the passage 95 out to the atmosphere by way of the exhaust duct 140. However, the slide valve 60 leaves the compressed air supply connected with the passages 61, 62, 65 and 50 in order to maintain the bottom series of fasteners and their path under air pressure for the next operation.

It will now be apparent that the novel device is a handy facility to drive the fasteners through the work with power and speed. The handle 21 concentrates both the support and driving control in the hand which holds the device; and, the latter being little over a foot in length in actual size, it is apparent that the slide handle 31 is close enough to be gripped with the other hand and operated in a longitudinal path, as described, as the nose of the device is applied to introduce the fasteners into the openings of the work. The air feed supplants the need of setting the fasteners by hand at the point where they are driven, accomplishing this by the primary use of the slide handle 31; and the moment this has been done, the trigger 23 may be operated to accomplish the driving action quickly and efficiently. The arrangement of the magazine supplies a large number of fasteners in readiness to be lined up from time to time in the path of feed, while furnishing room in the center of the magazine for the ram and plug driving means. The device is therefore operative to the best advantage and built along lines of compactness.

While I have described the invention along specific lines, various minor changes and refinements may be made therein without departing from its principle, and I reserve the right to employ all such changes and refinements as may come within the scope and spirit of the appended claims.

I claim:

1. In a fastener driving device, means for projecting a fastener to a frontal position for receiving a driving blow comprising a chamber containing a series of the fasteners in longitudinal sequence, a passage leading forwardly from said chamber to said position, means normally urging said series forwardly, a gate in front of the foremost fastener, a barrier clearing the second foremost fastener, second means operable to move the barrier in front of said second foremost fastener, third means actuated by said second means to move the gate aside from the foremost fastener, and fourth means also actuated by said second means to engage the foremost fastener from beehind and advance it in said passage.

2. The structure of claim 1, and an air feed leading into said passage and urging the foremost fastener to said position.

3. The structure of claim 1, said first-named means being an air feed leading into the rear end of said chamber.

4. The structure of claim 1, said barrier comprising a spring-backed plunger, said second means comprising a slide manually operable in rearward direction, and a cam carried by the slide and effective to move the barrier as stated.

5. The structure of claim 1, said second means comprising a slide manually operable in rearward direction, and said third means being a cam carried by the slide and effective to move the gate aside to clear the foremost fastener when the slide is operated as stated.

6. The structure of claim 1, said second means comprising a slide manually operable in rearward direction, and said fourth means comprising a spring-pivoted latch carried by the slide and adapted to pass under and engage the foremost fastener from behind when the slide is operated, as stated, and yieldable means resisting the rearward movement of the slide, such yieldable means operating when the latch engages the foremost fastener as stated to urge it in forward direction in said passage.

7. The structure of claim 1, said second means comprising a slide manually operable in rearward direction, and said fourth means comprising a spring-pivoted latch carried by the slide and adapted to pass under and engage the foremost fastener from behind when the slide is operated, as stated, yieldable means resisting the rearward movement of the slide, such yieldable means operating when the latch engages the foremost fastener as stated to urge it in forward direction in said passage, and an air feed in the latter behind the forwardly urged fastener effective to move it to said position.

References Cited in the file of this patent

UNITED STATES PATENTS

| 1,703,458 | Ruff | Feb. 26, 1929 |
| 2,222,125 | Stehlik | Nov. 19, 1940 |
| 2,445,674 | Kendall | July 20, 1948 |
| 2,546,354 | Bacon et al. | Mar. 27, 1951 |

FOREIGN PATENTS

| 122,504 | Australia | Oct. 15, 1946 |